June 19, 1962     H. HARTZ     3,039,281

ELASTIC COUPLING

Filed March 31, 1961

INVENTOR
HELMUT HARTZ

BY    AGENT

United States Patent Office 3,039,281
Patented June 19, 1962

3,039,281
ELASTIC COUPLING
Helmut Hartz, 1 Herner Strasse, Wanne-Eickel, Germany
Filed Mar. 31, 1961, Ser. No. 99,893
Claims priority, application Germany Apr. 2, 1960
8 Claims. (Cl. 64—27)

This invention relates to elastic couplings, and more particularly to couplings which are elastic in torsion.

Torsionally elastical couplings are employed for damping rotary shocks and for equalizing torque variations in the transmission of power between driving and driven shafts. Torque transmitting units, each consisting of an element of rubber or other yieldably resilient elastomeric material bonded between two metal elements, have been inserted as damping elements between driving and driven shafts but the torsionally elastic couplings used heretofore have not been satisfactory for connecting a shaft rotating about a fixed axis with a universal-joint shaft or the like the axis of which may shift radially and axially during each revolution.

The known torsionally elastic couplings thus cannot be used to full advantage, for example, for connecting the output shaft of a resiliently mounted electric motor to a fixedly mounted transmission shaft. The elastic coupling, if directly interposed between the output shaft and the transmission shaft, would interfere with free movement of the motor on its mountings. It is advantageous further to interpose at least one universal joint between the output shaft of the motor and the fixedly mounted transmission which prevents transmission of stresses to the motor which would interfere with the functioning of the resilient mountings.

The object of this invention is the provision of a torsionally elastic coupling which is suitable for insertion in the afore-described power train between the universal joint and the fixed transmission shaft, and for similar purposes.

Another object is the provision of such a coupling the torsional elasticity of which may be varied as required by specific operating conditions.

A further object is the provision of a coupling the damping effect of which is continuously adjustable.

Figure 1:
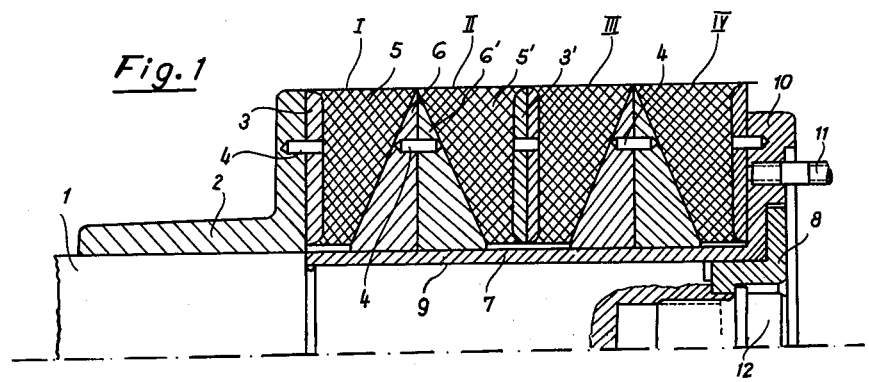
Figure 2:
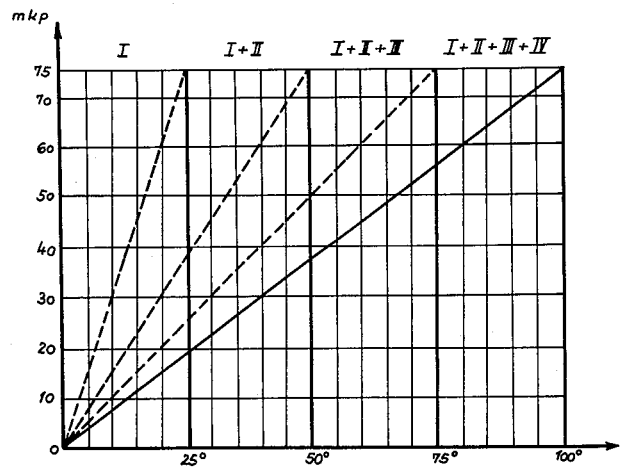

Other objects and many of the attendant advantages of this invention will be readily appreciated as the same becomes better understood by reference to the following detailed description of a preferred embodiment of the invention when considered in connection with the accompanying drawing wherein;

FIG. 1 shows a torsionally elastic coupling of the invention in fragmentary axial section; and FIG. 2 diagrammatically illustrates the response of the apparatus of FIG. 1 to applied torsional stresses.

Referring now to FIG. 1, there is seen one half of a torsionally elastic coupling of the invention, the view being in axial section. It will be understood that the non-illustrated other half of the coupling is substantially a mirror image of what is seen in FIG. 1.

The shaft 1, which may be the input shaft of a fixedly mounted transmission, carries a flange member 2 which is secured on the shaft 1 against rotation and axial movement. A terminal portion of the shaft 1 axially adjacent the flange member 2 is of reduced diameter and has a cylindrical face 9 on which a tubular metallic sleeve 7 is rotatable. The cylindrical inner and outer faces of the sleeve 7 are coated with nylon or other plastic material which reduces friction and has damping properties. The coating which is too thin to be visible on the scale of FIG. 1 may be applied to the sleeve 7 by spraying or by dipping the heated sleeve in a fluidized bed of plastic grains as is well known. The face 9 is preferably of non-ferrous metal to avoid fretting corrosion to which the face 9 would otherwise be susceptible.

The end of the sleeve 7 remote from the flange member 2 has an integral radially extending flange 10. The axial position of the sleeve 7 is secured by a retaining ring 8 which abuts from the outside on the flange 10 and is centrally fastened to the end of the shaft 1 by a screw 12. Circumferentially spaced bolts 11 of which only one is seen in FIG. 1 permit the flange 10 of the sleeve 7 to be attached, for example, to the suitably flanged end of a universal-joint shaft, not shown.

Four annular torques transmitting units I, II, III, IV are rotatable on the outer face of the sleeve 7. The four units are axially juxtaposed in a stack or group whose terminal members are respectively fastened to the flange member 2 and the flange 10 by pins 4. Similar pins secure adjacent portions of the units to each other.

The units are identical. Unit I includes a flat metal ring 3 fastened to the flange member 2 by the pin 4. To the radial face of the metal ring 3 a ring 5 of elastomeric material is bonded. The ring 5 has a concave conical face to which a corresponding convexly conical face of another metal ring 6 is bonded. The three rings 3, 5 and 6 thus constitute a hollow cylindrical laminated structure with flat radial end faces in which the yieldably resilient ring 5 is interposed between two rigid ring elements with one of which, namely the ring 6, it is in wedging engagement. The internal diameters of the rings 3 and 5 are slightly larger than the external diameter of the sleeve 7 but the broader axial face of the ring 6 is rotatably guided on the nylon coating of the sleeve 7.

The torque transmitting unit II is identical with unit I but its position on the sleeve 7 is inverted so that the conical metal ring 6' of unit II is axially adjacent the conical metal ring 6 of unit I. The two conical rings 6, 6' are secured to each other by several circumferentially spaced pins 4 of which only one is seen in FIG. 1. In a similar manner the flat metal ring 3' of unit II is secured to the flat metal ring portion of unit III which is oriented in the same manner as unit I, whereas unit IV again is arranged as unit II and its flat ring portion is pinned to the flange 10.

When torsional stresses are applied to the shaft 1 and the flange 10 of sleeve 7, the several torque transmitting units are twisted between the flange member 2 and the flange 10, and respond to the torsional stress in the manner diagrammatically illustrated in FIG. 2. In the graph of that figure, the abscissa indicates in degrees the angle of displacement between the axially terminal rigid portions of the torque transmitting unit or group of units under consideration, while the ordinate indicates the corresponding torque in arbitrary units.

The broken line I is the relatively steep characteristic of the unit I alone. To produce a relatively small angular displacement between the rigid rings 3 and 6, a relatively large torque must be applied to these rings to deform the resilient ring 5. The characteristic of the combined units I+II is less steep. The same torque when applied to the rigid rings 3 and 3' produces an angular displacement twice as great than when applied to the rings 3 and 6. In an analogous manner, an even shallower characteristic is obtained for the combination of units I+II+III, and the fully drawn line I+II+III+IV indicates the response of the full group of torque transmitting units illustrated in FIG. 1 to a torque applied to the shaft 1 and the flange 10 of the sleeve 7.

It is apparent that torsionally elastic couplings according to this invention but varying in response to applied torque, and thus varying in their damping characteristics for variations in the torque of a driving power source, may be assembled from different numbers of identical torque transmitting units.

The response of the coupling illustrated in FIG. 1 may further be adjusted by rotating the screw 12. In the position shown in FIG. 1, the screw is fully inserted in the corresponding axial recess of the shaft 1 so that the far end of the sleeve 7 abuts against the shoulder formed on the shaft 1 by the reduced diameter of the face 9. In this position, the torsion transmitting units, and more specifically the yieldably resilient rings thereof, are under maximum axial stress and this axial pre-stressing stiffens their response to additional torsional stresses. When the screw 12 moves axially outward of the shaft 1 from the illustrated position, the pressure of the retaining ring 8 on the flange 10 is reduced and the group of torque transmitting units will thereby respond to a torsional stress with a greater angular displacement of its terminal rigid elements secured to the flange member 2 and the flange 10, respectively.

When the sleeve 7 rotates relative to the shaft face 9, there is also relative movement of the retaining ring 8 and the adjacent face portions of the flange 10. The magnitude of the frictional engagement between the ring 8 and the face portions of the flange 10 depends partly on the axial pre-stress of the torsion transmitting units but also on the frictional properties of the contacting surfaces. These frictional properties may be influenced to a large extent to suit prevailing conditions and to obtain a desired damping effect. A lubricant introduced between the contacting surfaces on the ring 8 and the sleeve 7 or its flange 10 will reduce the frictional damping of sleeve movement relative to the shaft 1. A thrust bearing employing balls interposed between the radial contact faces of the ring 8 and the flange 10 will have a similar effect in a more permanent and reproducible manner. An annular disc of friction material interposed between these radial faces or a friction facing applied to at least one of the faces will have the opposite effect. The modifications available with the device illustrated thus permit a wide choice of operating characteristics without changes in the basic structure of the device.

The operation of the apparatus illustrated in FIG. 1 will now be described under the assumption that shaft 1 is the input or driven shaft of the coupling and that sleeve 7 or flange 10 is the output or driving member. Obviously, the driving and driven member in this apparatus are interchangeable.

Rotation of the shaft 1 and of the flange member 2 which is fixedly mounted on the shaft is transmitted by the pins 4 to the flat metal disc 3 of the torque transmitting unit I and thereby to the yieldably resilient ring 5. Rotation of the flat radial face of the resilient ring 5 causes rotation of the conical face thereof with an angular displacement the magnitude of which depends on the magnitude of the load connected to the output member 10. The angular displacement of the rotary movement is sequentially magnified by units II, III, and IV. The units rotate relative to the sleeve 7 and the magnitude of this rotation decreases from unit I toward unit IV, the latter being secured to the flange 10 by its terminal metal disc. The flange 10 thus is elastically coupled to the input shaft 1 while having a fixedly determined axial position and rotating about a fixed axis, namely the common axis of the shaft 1 and of the sleeve 7.

When cyclically variable torsional stresses are applied to the shaft 1 and the flange 10, as in the transmission of power from or toward a universal-joint shaft the output and input portions of which are not in line, the sleeve 7 performs a rotary oscillating movement relative to the shaft 1 while rotating with the latter, and the several torque transmitting units I to IV perform corresponding oscillating movements relative to the sleeve 7. The amplitude of these oscillations will depend on the overall elastic properties of the group of torque transmitting units and on the friction between the rotatably engaged several elements of the coupling. A nylon coating or the like on the sleeve 7 reduces a friction factor which is not readily controlled to an insignificant value. Other portions of the overall friction in the coupling may be adjusted and varied, as has been described above. The path of every element of the coupling during its oscillatory movement is strictly defined by the guiding engagement of the sleeve 7 on the shaft face 9 and by the central guidance given to the torque transmitting units by the external cylindrical face of the sleeve 7. Oscillations transverse to the axis of rotation are damped and virtually eliminated by the nylon coating on the sleeve 7.

The permanent stress induced in the torque transmitting units I to IV by tightening of the screw 12 is preferably of sufficient magnitude to prevent any significant axial movement of the flange 10 under cyclic axial stresses applied, for example, by a universal-joint shaft.

The amount of frictional damping to be provided between the retaining ring 8 and the flange 10 will be determined largely by the frequency of the oscillations induced by the applied torque variations and by the properties of the material from which the yieldably resilient rings 5, 5' are made. Natural rubber, for example, is less susceptible to heating than butadiene-styrene rubber (GR-S) when subjected to alternating stresses at high frequency. Natural rubber employed in the yieldably resilient rings of the torque transmitting units thus will permit greater oscillation amplitudes under otherwise similar conditions than GR-S synthetic rubber without undue temperature increase which would affect the response of the coupling. Where the frequency of the torque variations encountered is low, supplemental friction means between the shaft 1 and the sleeve 7 are unnecessary, and even undesirable, and lubrication of the contact faces of the ring 8 and the flange 10, or an interposed antifriction bearing will be resorted to, as discussed above.

Those skilled in the art will appreciate that the coupling illustrated and described may be varied in many additional aspects when following the teachings of this disclosure. While torque transmission by a group of annular identical units is preferred because of the simplicity and adaptability of such an arrangement, the several units illustrated may obviously be combined into a unitary structure having a plurality of axially sequential portions which are alternatingly rigid and yieldably resilient.

For reasons of manufacturing economy, we have found it desirable to coat the sleeve 7 with nylon or the like but the antifriction effect of such a coating would also be obtained by applying coatings to the face 9 of the shaft 1 and to the portions of the rings 6, 6' which are in rotating contact with the external cylindrical face of the sleeve 7.

The annular units I to IV, which form a single group of torque transmitting elements, may also be replaced by a plurality of circumferentially spaced groups of such elements which may each have the cross sectional shape of the segment of a ring and which are arranged within the group and between the flange member 2 and the flange 10 in the manner described with reference to the annular units shown in FIG. 1. An arrangement with circumferentially spaced multiple groups or stacks of units will have a more shallow characteristic than a group of annular elements and may be preferred when such a characteristic is desired.

It will be understood, therefore, that the foregoing disclosure relates to only a preferred embodiment of the invention and that it is intended to cover all changes and modifications of the example of the invention herein chosen for the purpose of the disclosure which do not constitute departures from the spirit and the scope of the invention as set forth in the appended claims.

What I claim is:

1. In a torsionally elastic coupling, in combination, a driving member and a driven member rotatable about a common axis, one of said members having a cylindrical face, and the other member being tubular and rotatable on said face; a plurality of torque transmitting units rotatable on said tubular member about said common axis, said units being arranged in a group in axially juxtaposed relationship, each of said units including at least one substantially rigid element and one resiliently yieldable element axially adjacent said rigid element and secured thereto; securing means for securing axially adjacent portions of respective units to each other; and fastening means for respectively fastening two axially terminal units of said group to said members.

2. In a coupling as set forth in claim 1, said units being annular about said axis.

3. In a coupling as set forth in claim 1, the rigid element and the resilient element of at least one of said units having respective conical faces about said axis in conforming abutting engagement.

4. In a coupling as set forth in claim 3, the rigid element and the resilient element of a second one of said units axially adjacent said one unit having respective conical faces about said axis in conforming abutting engagement, the conical faces of respective axially adjacent elements of said one unit and of said other unit tapering axially in opposite directions.

5. In a coupling as set forth in claim 1, radially extending flange means on said driving member and on said driven member respectively, said group of torque transmitting units being interposed between the flange means on said members, said two axially terminal units being respectively fastened to said flange means by said fastening means.

6. In a coupling as set forth in claim 5, abutment means mounted on said one member for urging the flange means on said tubular member axially toward the flange means on said one member against the resilient constraint of said torque transmitting units.

7. In a coupling as set forth in claim 6, frictional engagement means interposed between said abutment means and said tubular member, said abutment means being secured on said one member.

8. In a torsionally elastic coupling, in combination, a driving member and a driven member rotatable about a common axis, one of said members having a cylindrical face, and the other member being tubular and rotatable on said face; a plurality of torque transmitting units rotatable on said tubular member about said common axis, said units being arranged in a plurality of circumferentially spaced groups of axially juxtaposed units, each of said units including at least one substantially rigid element and one resiliently yieldable element axially adjacent said rigid element and secured thereto; securing means for securing axially adjacent portions of respective units to each other; and fastening means for respectively fastening two axially terminal units of each of said groups to said members.

References Cited in the file of this patent
UNITED STATES PATENTS

| | | |
|---|---|---|
| 2,207,496 | Anderson | July 9, 1940 |
| 2,910,843 | Happ et al. | Nov. 3, 1959 |

FOREIGN PATENTS

| | | |
|---|---|---|
| 455,275 | Great Britain | Oct. 12, 1936 |